United States Patent
Sewell et al.

(10) Patent No.: US 11,692,868 B2
(45) Date of Patent: Jul. 4, 2023

(54) SENSORS

(71) Applicant: Bristol Maritime Robotics Ltd, Bristol (GB)

(72) Inventors: Richard Sewell, Torfaen (GB); Thomas Rooney, Bristol (GB)

(73) Assignee: Bristol Maritime Robotics Ltd, Bristol (GB)

( * ) Notice: Subject to any disclaimer, the term of this patent is extended or adjusted under 35 U.S.C. 154(b) by 303 days.

(21) Appl. No.: 16/897,280

(22) Filed: Jun. 10, 2020

(65) Prior Publication Data

US 2020/0393291 A1    Dec. 17, 2020

(30) Foreign Application Priority Data

Jun. 11, 2019 (GB) ................................ 1908291

(51) Int. Cl.
*G01H 11/06* (2006.01)
*G01D 5/14* (2006.01)
*G01P 15/00* (2006.01)

(52) U.S. Cl.
CPC ............. *G01H 11/06* (2013.01); *G01D 5/145* (2013.01); *G01P 15/00* (2013.01)

(58) Field of Classification Search
CPC ........ G01H 11/06; G01H 11/02; G01D 5/145; G01D 21/00; G01P 15/00; G01P 5/04; G01B 5/20; G01B 7/016; B25J 13/081; G01L 5/169; G01L 5/228
USPC .......................................................... 73/579
See application file for complete search history.

(56) References Cited

U.S. PATENT DOCUMENTS

| | | | | |
|---|---|---|---|---|
| 5,256,969 A | * | 10/1993 | Miyajima | G01R 33/385 324/318 |
| 10,024,713 B1 | * | 7/2018 | Martin | G01H 11/02 |
| 10,486,314 B1 | * | 11/2019 | West | G01L 5/009 |
| 2003/0011358 A1 | * | 1/2003 | Karpinski | F16C 41/007 324/173 |
| 2008/0235972 A1 | * | 10/2008 | Hartmann | G01F 1/28 33/732 |
| 2010/0071222 A1 | * | 3/2010 | Solomon | G01F 1/32 33/556 |
| 2011/0029470 A1 | * | 2/2011 | Hartmann | G01B 5/20 706/15 |

(Continued)

FOREIGN PATENT DOCUMENTS

CN    108995582 A    12/2018
CN    108995582 A2   12/2018

(Continued)

OTHER PUBLICATIONS

Emnett, Graff, Hartmann, A Novel Whisker Sensor Used for 3D Contact Point Determination and Contour Extraction, Proceedings of Robotics: Science and Systems XIV, 2018, Sections II Methods and III Results, Part A: Follicle Design, Northwestern University, Evanston, IL.

(Continued)

*Primary Examiner* — Giovanni Astacio-Oquendo
(74) *Attorney, Agent, or Firm* — Lightbulb IP, LLC

(57) ABSTRACT

A sensor comprising a whisker shaft and a follicle is provided. The shaft has a root end and a tip end and the shaft tapers from the root end to the tip end so that the root end is wider and the tip end is narrower. The root end is pivotably mounted in the follicle.

17 Claims, 8 Drawing Sheets

(56) References Cited

U.S. PATENT DOCUMENTS

| | | | | |
|---|---|---|---|---|
| 2015/0075250 A1* | 3/2015 | Kosa | ............... | G01L 25/00 73/862.041 |
| 2016/0169754 A1* | 6/2016 | Kowalewski | ......... | G01L 5/162 73/862.541 |
| 2019/0048495 A1* | 2/2019 | Collinson | ............ | D02J 1/224 |
| 2019/0323816 A1 | 10/2019 | Song et al. | | |

FOREIGN PATENT DOCUMENTS

| | | |
|---|---|---|
| WO | WO2019/024575 A1 | 2/2019 |
| WO | WO2019024575 A | 2/2019 |
| WO | WO2019024575 A1 | 2/2019 |

OTHER PUBLICATIONS

Assaf, Wilson, Welsby, Porrill, Pearson, Visual-tactile sensory map calibration of a biomimetic whiskered robot, Proceedings—IEEE International Conference on Robotics and Automation, 2016, Section II a Background, Platform, and Fig. 2, IEEE International Conference on Robotics and Automation (ICRA), Stockholm, Sweden.

Pearson, Mitchinson, Welsby, Pipe, Prescott, SCRATCHbot: Active Tactile Sensing in a Whiskered Mobile Robot, From Animals to Animats, Journal on Data Semantics, Lecture Notes in Computer Science, 2010, p. 94, vol. 6226, Springer-Verlag, United Kingdom.

Wegiriya Hasitha et al., A Biologically Inspired Multimodal Whisker Follicle, 2016 IEEE International Conference on Systems, Man, and Cybernetics (SMC), Oct. 9, 2016 (retrieved on Feb. 6, 2017), pp. 3847-3852, p. 3848, sections "A. Whisker Sensor" and "B. Characterization of the Sensor," Figure 1, IEEE, XP033060738.

R. Andrew Russel et al., Object Location and Recognition using Whisker Sensors, Proceedings of the 2003 Australasian Conference on Robotics & Automation, Dec. 3, 2003 (retrieved Oct. 27, 2020), pp. 1-9, abstract, section "A. Artificial Whisker," pp. 1-2, Figure 1, section "C. Experimental measurements of whisker deflections," p. 2, Figure 2, Brisbane Qld Australia, XP055744484, ISBN: 978-0-9587583-5-2, http://citeseerx.ist.psu.edu/viewdoc/download?doi=10.1.1.11.1271&rep=rep1&type=pdf.

* cited by examiner

SENSORS

The present invention relates generally to sensors and particularly, although not exclusively, to whisker-based and/or whisker-like sensors, for example for challenging or hazardous environments, including underwater and terrestrial applications such as low or zero visibility environments.

Advanced underwater operations, such as demining and maintenance of an oil rig, require intervention and surveying. A diver, or a trained animal like a seal, would intuitively use tactile perception to perform this task. A Remotely Operated Vehicle (ROV) equipped with an appropriate sensory and motor control infrastructure and, importantly, a human operator, could also perform this task.

However, divers, animals and ROVs have numerous disadvantages such as risk to human life, fatigue, short operational range, the need of support vessels and ultimately cost.

The use of AUVs is becoming a more attractive proposition when tackling underwater problems. However, AUVs can suffer from a paucity of sensory information and this can limit close proximity work.

Some underwater tasks are still extremely difficult for an artificial autonomous agent to undertake. For example, operating in close proximity to harbour walls, seabed, and infrastructure can be particularly difficult. This difficulty is heightened by incomplete sensor coverage of the immediate area, which is an inherent trait of conventional sensors such as cameras and sonar.

Sonar sensors are good at long ranges of 25 m to 400 m for example, as their field of view covers vast areas, but are effectively "blind" in very close proximity. This blind area is approximately a 0.5 m radius around the majority of an AUV. By "blind", it is meant that the vehicle gains little robust and useful navigational data from these sensors, and by short range is meant from objects touching or within half a metre. Furthermore, such sensors are less reliable in cluttered and visually or acoustically occluded environments such as harbours.

As the environmental conditions become more challenging, the sensory data becomes more unreliable. Simple, robust local awareness through the extraction of tactile information from nearby objects can be sufficient to operate in such challenging environmental conditions.

Thus, a requirement exists for improvements to be made to current Autonomous Underwater Vehicle (AUV) technologies to allow them to operate and interact effectively in close proximity and in visually occluded environments.

The present invention seeks to provide improvements in or relating to sensors suitable for AUVs and amphibious unmanned ground vehicles (A-UGVs).

An aspect of the present invention provides an artificial whisker sensor comprising an elongate body having a root end and a tip end, in which the body tapers from the root end to the tip end so that the root end is wider and the tip end is narrower, the root end is mounted in a hub, with the hub being in a suspended, free pivoting joint, and the pivot point of the body is at substantially the centre point of the hub.

The hub may be mounted in elastomeric material.

In some embodiments a whisker is attached to a (for example stainless-steel) hub, which is suspended in an elastomeric material to allow it to move. In such embodiments the root end of the whisker is not attached directly to the elastomer.

A further aspect of the present invention provides an artificial whisker sensor comprising an elongate body having a root end and a tip end, in which the body tapers from the root end to the tip end so that the root end is wider and the tip end is narrower, the root end is pivotably mounted in a mount in a suspended, free pivoting joint, and the pivot point of the body is at substantially the centre point of the mount.

The mount may be formed from an elastomeric material.

According to a further aspect of the present invention there is provided an artificial whisker sensor comprising an elongate body having a root end and a tip end, in which the body tapers from root end to the tip end.

Taking bio-inspiration from the walrus, seal and manatee, artificial tactile whiskers are used by the present invention to address the sensory deficiency of, for example, AUVs and therefore enable reliable close proximity work.

One feature of whisker design provided by the present invention, therefore, is a tapered whisker geometry (as opposed to, for example, a parallel, straight cylindrical, geometry).

Parallel whiskers are prone to frequency lock-in, where a narrow frequency of vortex shedding is strongly favoured over a range of fluid velocities. Tapered whiskers however have a broad range of shed frequencies, and so enable significantly higher resolution of fluid velocity (and viscosity) measurement from vortex shedding. It is expected that for this project a broad range of frequency sensitivities are needed, so a cylindrical whisker will not be used. The tapered whisker is more suitable. The taper in this experiment was from 1.5 mm at the whisker root to 0.7 mm at the tip.

The tapering may be generally constant along the length of the body.

The body may be formed from a composite material such as a glass reinforced plastics material (GRP).

The body may have a generally elongated cone shape i.e. tapering gradually and constantly from the root to the tip.

In one embodiment the body is approximately 1.5 mm at the root end and approximately 0.7 mm at the tip end.

The present invention also provides a whisker sensor assembly comprising a whisker sensor mounted in a housing, a magnet is attached to the whisker and a magnetic sensor is provided in the housing to detect the position of the magnet and hence the whisker.

The whisker may be mounted on a hub and the hub may be mounted in an elastomeric suspension.

An accelerometer may be provided at or near the base of the whisker.

The present invention also provides a whisker array comprising a cluster of a plurality of tactile whiskers. In some embodiments a cluster consists of three tactile whiskers. A local processor may be provided.

The present invention also provides an vehicle, suitable for use underwater, and/or in submerged conditions and/or obscured by soft, fluid or granular material, provided with one or more whisker sensors and/or whisker assemblies and/or whisker arrays according to any preceding claim. Some aspects and embodiments relate to a whisker array suitable to fit to an AUV or an A-UGV.

Some aspects and embodiments relate to whisker flow field assisted underwater navigation.

Some aspects and embodiments relate to the use of whiskers to improve the accuracy of underwater navigation, whilst also being covert and/or economical. The increase in accuracy may be achieved by using local flow-field data (fluid dynamics and interactions around an underwater robot) from robotic whiskers to assist IMU (inertial measurement unit) based navigation.

Existing underwater navigation systems already use acoustic based flow data (water column) or bottom tracked velocity data to assist with inertial navigation. This data is typically gathered from a Doppler Velocity Log (DVL), which is an expensive and noisy (acoustically loud) ultrasonic sensor. Other available flow sensors, e.g. paddle and propeller styles, are not used for navigation because they do not work well with angled flows and turbulent flow. These are not inherent issues for a whisker and they can be effective flow sensors.

Artificial tactile whisker sensors formed in according with the present invention can, for example, provide an approach to localisation that is robust to harsh environmental disturbances, endowing autonomous systems with the ability to operate effectively in confined, noisy and visually occludes spaces.

Marine engineering applications can benefit from such tactile sensors due to the lack of robust underwater close proximity sensing techniques.

An array of such tactile sensors mounted on a mobile submersible could be used to generate a "haptic map" of a region of the work area, containing characteristic features such as surface form, texture and compliance. Inspiration for the design of such an array may come from the Walrus, which have whiskers of varying length and thickness, that are capable of distinguishing small shapes in the silt of the seabed.

For an AUV to successfully complete an underwater task the following criteria may be important:

1. The AUV must maintain an accurate estimate of its location with respect to the work area. This validates the data or interactions undertaken, feeding into a 3D world model whiskers which will insert high probability information, by means of contacting and whisking the surrounding surfaces.

2. The AUV must identify its target area/object. By palpating and probing the target surface, additional information can be extracted such as texture and compliance, when fused with surface form, a classification of the area/object can be made.

3. The AUV must interact with its environment with high precision; at the low level, whiskers will provide data to be conditioned into a useable signal by a control system, this then provides a foundation for safe and accurate interactions.

Further aspects and embodiments may be based on one or more of the following.

Using tapered compliant whiskers to measure 2D interpretation of 3D fluid flow (currently in water, but other liquids and gases are possible).

Machining tapered whiskers by grinding with shaped spacers or forming tapered whiskers by moulding (such as injection moulding) or by additive manufacture.

Using clusters of 3 whiskers to measure 3D flow and flow field interactions, this includes effects caused by the robot the whiskers are on and effects from the environment such as boats or river flow. Three may be the minimum number of whiskers needed; it could be more distributed over an underwater robot, or it could be several clusters of three.

Using two such clusters to measure flow round an underwater vehicle so as to assist with underwater navigation; or for other purposes, e.g. measuring flow during docking of ship's hull against dock wall.

System of 3 whiskers and a local processor (and sometimes an accelerometer) as a packaged unit.

Using an accelerometer mounted near whisker base to identify platform vibration, which destroys whisker vortex-shedding and so interferes with/destroys signal.

Mechanically isolating whiskers from platform (e.g. with an elastic suspension) so as to tolerate platform vibration.

Sensing whisker motion at the whisker base (e.g. providing the whisker as a pinned beam).

Using an elastomeric suspension, consisting of a rigid hub cast into elastomer, so elastomer is providing both the pivot/support and the restoring force.

Sensing with a magnet in the hub and a high-frequency magnetic-field-orientation sensor.

Using both whisker deflection and whisker vortex induced vibration to measure flow speed, via some algorithms we are developing.

Using hyperresolution methods to improve FFT analysis.

Using whisker deflection and whisker vibration along with a known motion to measure fluid viscosity (e.g. in silt)

Using tapered whiskers for avoiding vortex induced vibration lock-in frequency gives weaker signals but a greatly broader sensitivity.

Using whisker deflection along with a known motion to measure hardness of a surface.

Palpating whiskers with an actuator to measure fluid viscosity; and other methods for vibrating a cylinder, including a tapered cylinder, to measure viscosity.

Palpating a whisker with a scanning actuator to map viscosity over a volume.

Palpating a whisker with a scanning actuator to measure surface contours or to identify unexpected objects.

Dragging a whisker across a surface to infer textural data (e.g. paint condition, corrosion, marine fouling).

Whiskers with a rugged type designed to work in challenging environments such as maritime.

Separating the suspension/hub component from the sensor, so we can easily swap the whisker and suspension for service without disturbing waterproof electrical connections.

Providing whiskers on an underwater robot,

A robot for nuclear decommissioning.

A robot for hull inspection.

A robot for agri-tech and ocean monitoring/maritime robotics.

A further aspect provides a sensor comprising a whisker shaft and a follicle, the shaft having a root end and a tip end, in which the shaft tapers from the root end to the tip end so that the root end is wider and the tip end is narrower, the root end is mounted in the follicle so as to provide a uniformly suspended pivot.

The pivot point of the body may be at substantially a centre point of the follicle.

A further aspect provides an artificial whisker sensor for taking angular measurements, comprising a beam-like body having a root end and a tip end, in which the body tapers from the root end to the tip end so that the root end is wider and the tip end is narrower, the root end is mounted in an artificial follicle, and the beam-like body is free pivoting in the follicle.

A further aspect provides a sensor comprising a whisker shaft and a follicle, the shaft having a root end and a tip end, in which the shaft tapers from the root end to the tip end so that the root end is wider and the tip end is narrower, the root end is mounted in the follicle so as to provide a uniformly suspended pivot.

The pivot point of the body may be at substantially a centre point of the follicle.

A further aspect provides an artificial whisker sensor for taking angular measurements, comprising a beam-like body having a root end and a tip end, in which the body tapers from the root end to the tip end so that the root end is wider and the tip end is narrower, the root end is mounted in an artificial follicle, and the beam-like body can pivot in the follicle.

In some embodiments the whisker root end can move smoothly over a range of angles.

A centre of rotation of the whisker may be in the follicle.

The follicle may include elastomeric material for providing a restoring force for the whisker.

A further aspect provides a sensor comprising a whisker shaft and a follicle, the shaft having a root end and a tip end, in which the shaft tapers from the root end to the tip end so that the root end is wider and the tip end is narrower, and the root end is pivotably mounted in the follicle.

The whisker root end may be attached to a hub, and the hub is mounted in an elastomeric block provided in the follicle.

The whisker may tend to pivot about a point generally at the centre of the hub.

The pivot point of the whisker body may be at substantially a centre point of the follicle.

The present invention also provides a method of tactile exploration comprising: providing one or more artificial whisker sensors, the or each sensor comprising a tapered, elongate body; moving the whisker through material of interest and in doing so causing vortex-induced vibration; and measuring the frequency spectrum of the vibration.

The method may comprise the step of measuring and/or calculating and/or inferring whisker speed and/or material viscosity.

The method may comprise the step of measuring motion of the sensor/s at the root end thereof.

Methods described herein may be performed using one or more whisker sensors and/or whisker assemblies and/or whisker arrays and/or a vehicle as described herein.

Different aspects and embodiments of the invention may be used separately or together.

Further particular and preferred aspects of the present invention are set out in the accompanying independent and dependent claims. Features of the dependent claims may be combined with the features of the independent claims as appropriate, and in combinations other than those explicitly set out in the claims.

The present invention is more particularly shown and described, by way of example, in the accompanying drawings, in which.

Figure 1:
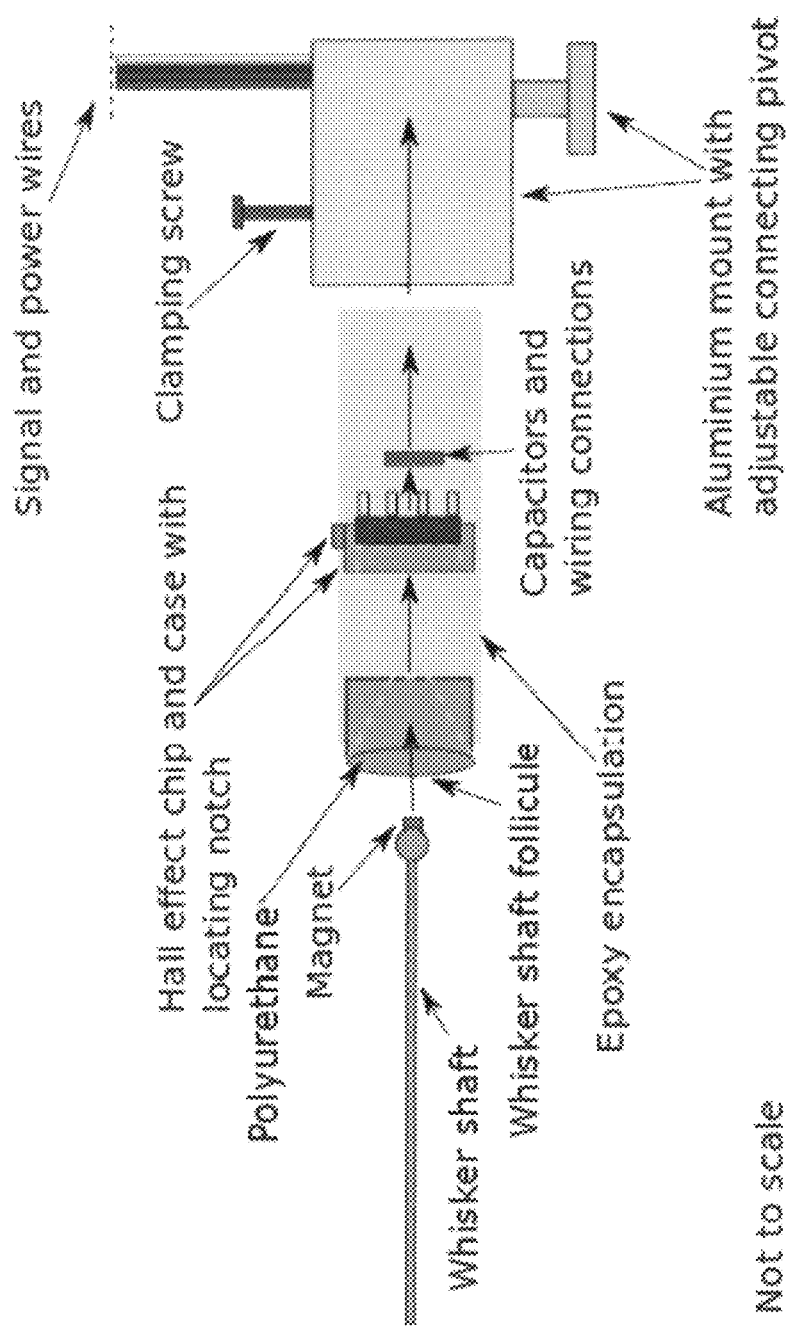
FIG. 1 illustrates a general principle of a whisker assembly formed in accordance with embodiments of the present invention.

The example embodiments are described in sufficient detail to enable those of ordinary skill in the art to embody and implement the systems and processes herein described. It is important to understand that embodiments can be provided in many alternative forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In the description, all orientational terms, such as upper, lower, radially and axially, are used in relation to the drawings and should not be interpreted as limiting on the invention.

FIG. 1 illustrates a general principle of a whisker assembly formed in accordance with embodiments of the present invention.

The assembly has a machined Delrin (or other marine grade material) housing containing epoxy-potted electronics, an elastomeric whisker suspension, and a glass-reinforced plastic (GRP) whisker. It uses marine-grade materials and is designed to be submerged. Submerged depth is limited by the depth ratings of the cable and connectors used, and not the design of the whisker itself. The whisker design has no areas of pressure differences and is solid state in other parts, so is predicted to be functional at depths in the magnitude of kilometres deep.

The sensing principle involves a permanent magnet attached to the whisker base and a magnetic sensor (for example Melexis MLX90333 or MLX90363) detects the position of the magnet, and hence the position of the whisker.

In some embodiments the whisker assembly is designed so the whisker attaches to a hub with a flange, which sits inside a cylindrical recess with openings at top and bottom for the whisker shaft and the magnet. It allows testing of two kinds of suspension—either a pair of O-rings, or a cast-in-place elastomer. O-rings have the practical advantage that they are commercially available in a range of materials and Shore A hardness. Cast-in-place allows access to a different selection of materials, and also allows a slightly different mechanical behaviour, since it fills the cavity completely.

The O-ring design offers high quality and uniform material, but has been shown in experiments for this project to be unsuitable for sensing Vortex Induced Vibrations (VIV). To sense VIV the material must be compliant enough to allow movement by the small forces generated by the specific vortices shed by the specific whisker. The compliant material must also be elastic enough to restore to the centre position and not accumulate significant deformation. The compliant material used in some embodiments is polyurethane with a stiffness of approximately Shore A 20.

The artificial whisker therefore may consist of a flexible shaft mounted into a polyurethane filled casing referred to as the whisker follicle. In some embodiments the end of the mounted whisker shaft is effectively a ball joint which is designed to pivot above a Hall Effect sensor IC.

A small neodymium magnet is bonded to the mounted base of the whisker such that it conveys the 2D angular pivot position of the whisker shaft. This assembly is mounted into a follicle holder which houses the tri-axis Hall effect sensor IC (e.g. Melexis MLX90363, MLX90393 or MLX90333) which is aligned such that the magnet attached to the whisker shaft is suspended directly above the Magneto-Concentrator on the IC. This programmable sensor can be configured to generate digital signals or analogue output voltages, proportional to the degree of displacement of the magnetic field in the orthogonal axes from a calibrated zero position. The third axis, which is in-line with the whisker shaft, has been physically constrained. Therefore, any deflections of the whisker shaft can be measured as a proportional displacement vector at the base and captured using a computer or microcontroller or a standard Analogue to Digital Converter (ADC) at a maximum sample rate of, for example, up to 2 KHz, for example up to 1.5 KHz or up to 1 kHz.

The whisker assembly may sense motion of the whisker shaft at the base of the shaft, where the magnet is located. Deflection of the shaft rotates the magnet about a pivot point. Utilisation of a magnet and Tri-axis Hall Effect sensor offers a 2 kHz sampling rate and a robust non-contact solution. In some embodiments the whisker can sense both AC and DC deflections, so therefore can sense a static deflection (i.e. force loading), and oscillating deflection (i.e. vibration).

In some embodiments the sampling electronics consists of a custom-built Printed Circuit Board (PCB) and a dsPIC30f4011 micro-controller programmed to sample the analogue voltages across all 6 channels of a 3 whisker array at 500 Hz. The micro-controller relays this information via a Universal Asynchronous Receiver/Transmitter (UART) serial port in singular whisker mode, or via a combination of UART and Serial Peripheral Interface (SPI) to a FTDI FT232R USB bridge for high bandwidth communications. Both communications use a standard desktop computer as an end point for logging, live processing and offline analysis.

Figure 2:
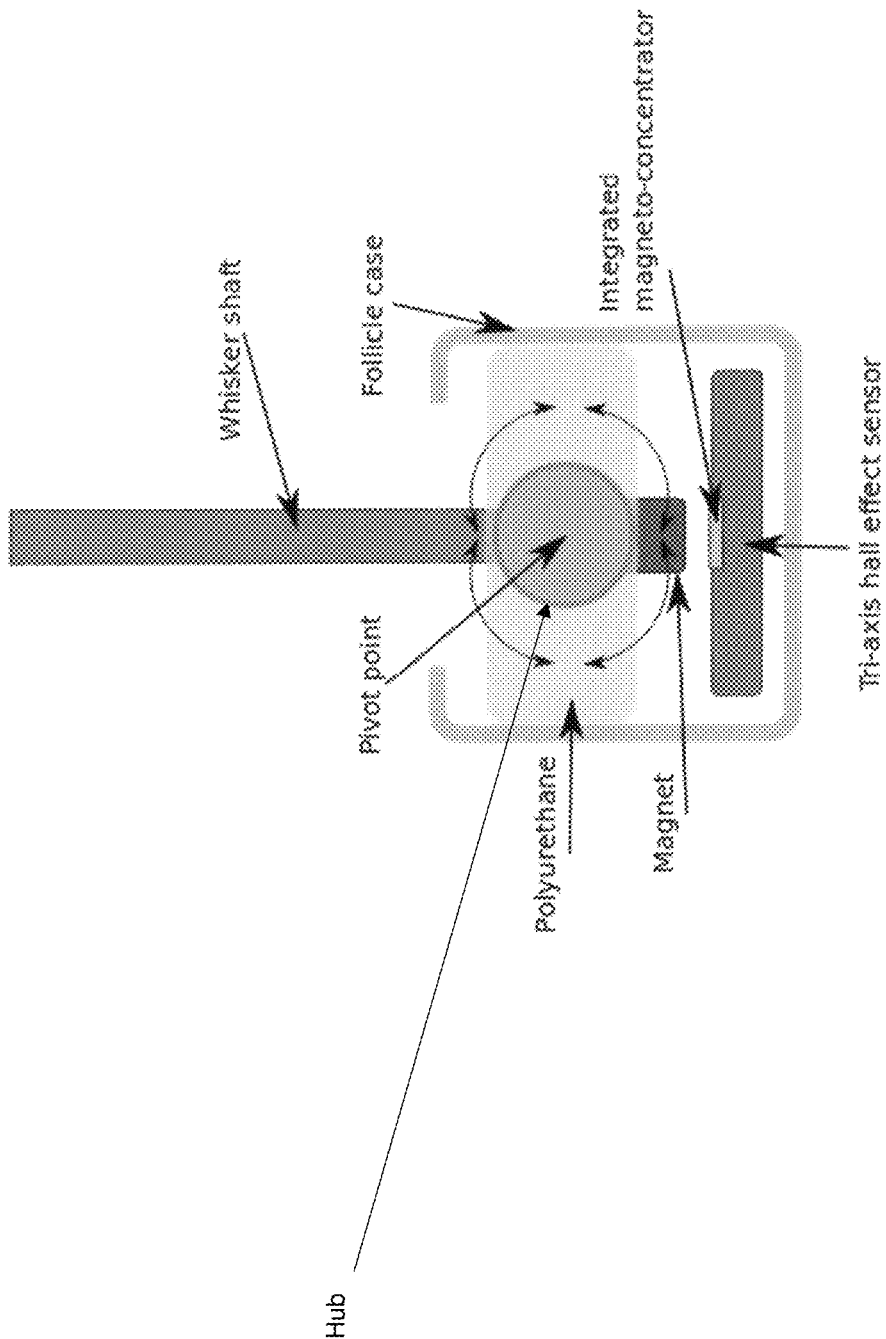
FIG. 2 shows a whisker shaft is attached to a hub.

As shown in FIG. 2 a whisker shaft is attached to a hub. The hub is suspended in a rubbery polyurethane block, which means it tends to pivot about a point at the centre of the hub (which may or may not be at the centre of a follicle).

Figure 3:
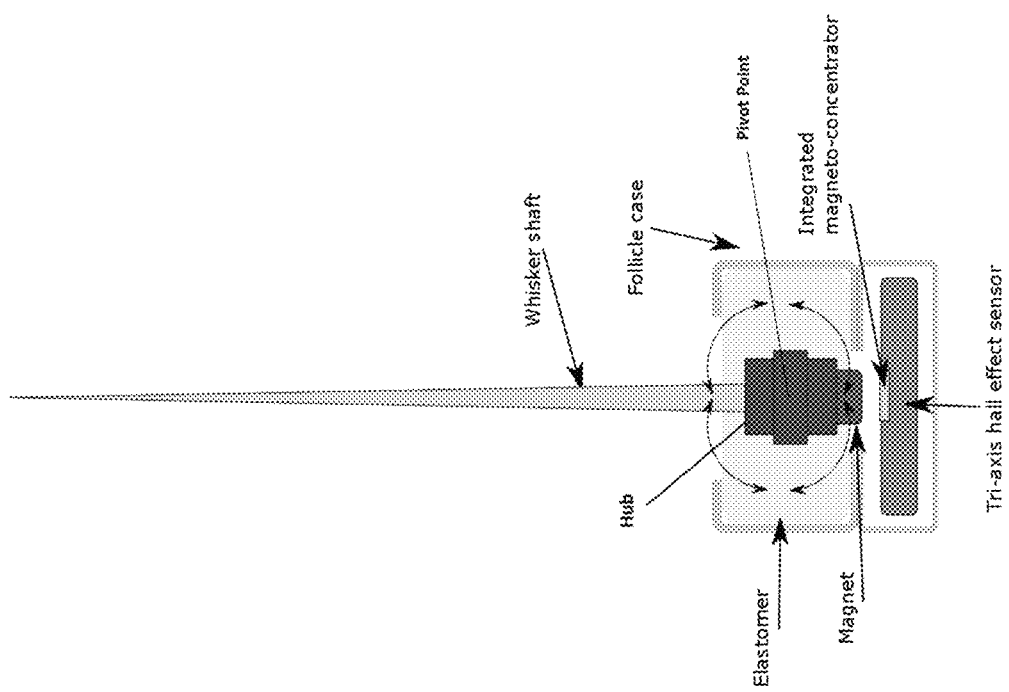
FIG. 3 shows a whisker sensor formed in accordance with an embodiment of the present invention.

FIG. 3 shows a whisker sensor formed in accordance with an embodiment of the present invention.

The whisker is tapered from its (narrower) tip end to its (wider) root end. The root end is mounted in a follicle case. The whisker root end is attached to a hub and the hub is suspended in an elastomeric block to provide a pivoting joint (i.e. not a cantilevered joint). The hub can move in X, Y and Z directions and the centre of rotation of the whisker is at the centre of the hub (and not, for example, at the base of the whisker). The whisker follicle arrangement includes a magnet which is located above a sensor for detecting movement.

The whisker is attached to a stainless-steel hub, which is suspended in an elastomeric material to allow it to move. In this embodiment the root end of the whisker is not attached directly to the elastomer.

The whisker can move smoothly over a range of angles, the centre of rotation is in the follicle, but there's a restoring force from the elastomer. The elastomer constrains the pivoting motion.

Figure 4:
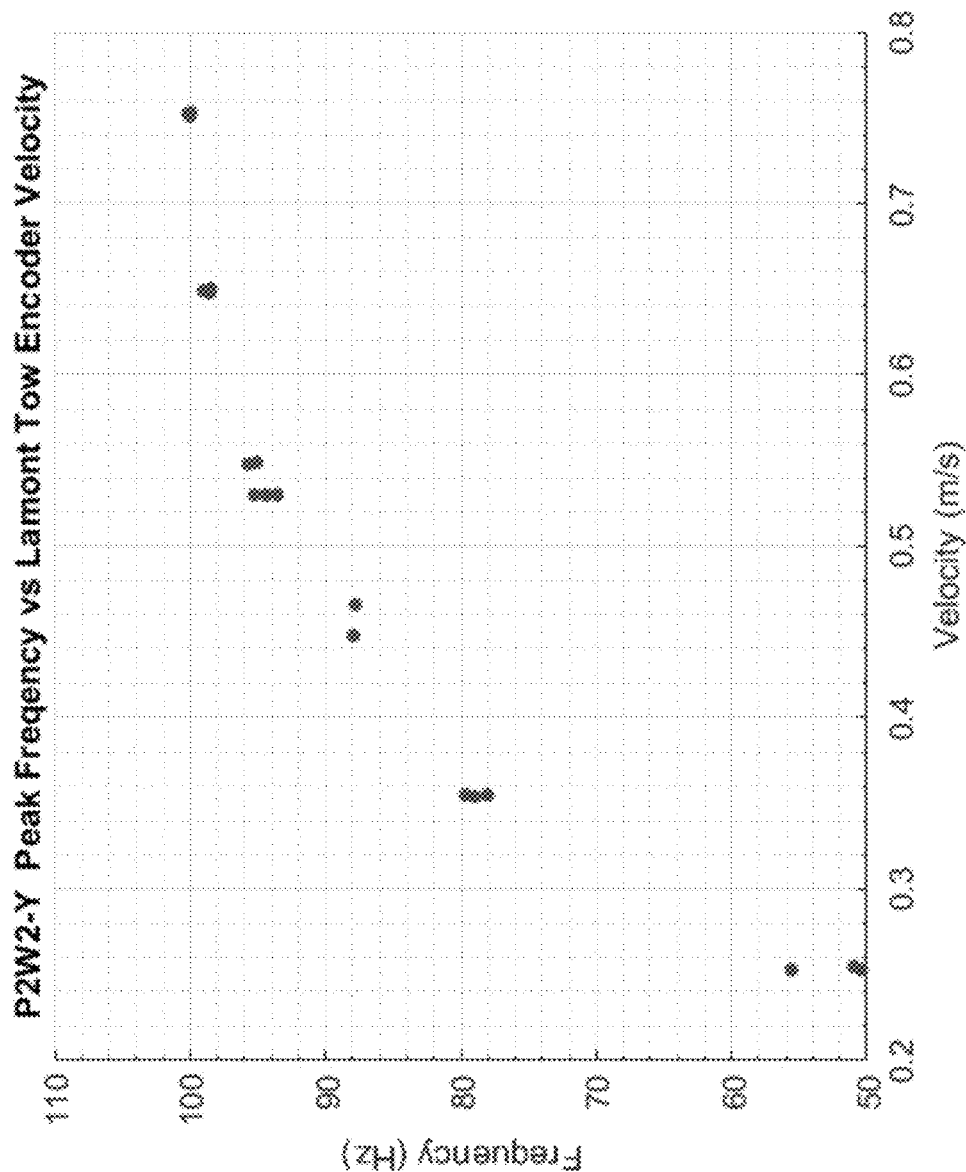
FIG. 4 shows the variation of one measure of the spectrum (the frequency of the strongest peak) with speed for a particular tapered whisker in water.

FIG. 4 shows the variation of one measure of the spectrum (the frequency of the strongest peak) with speed for a particular tapered whisker in water.

FIG. 4: When a whisker is moved through a fluid, vortex-induced vibration is caused. With a whisker of any shape, the frequency spectrum of this vibration varies with speed and viscosity, and so the spectrum can be used to infer speed. With a tapered whisker, this variation is a particularly useful measure.

Figure 5:
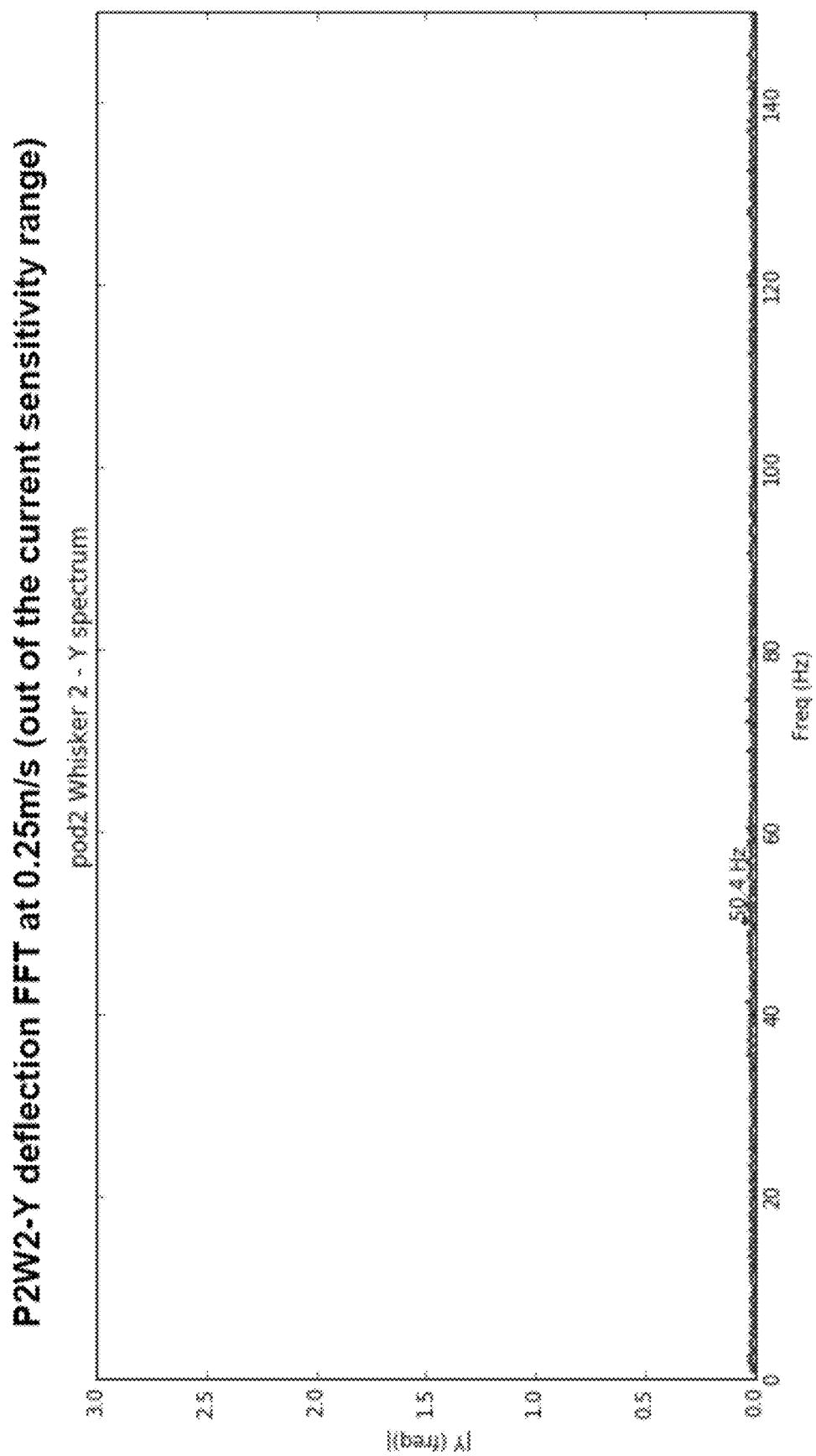
FIG. 5 shows the frequency spectrum at a low speed, below the sensitivity range of the whisker under test. No significant peak is visible.
Figure 6:
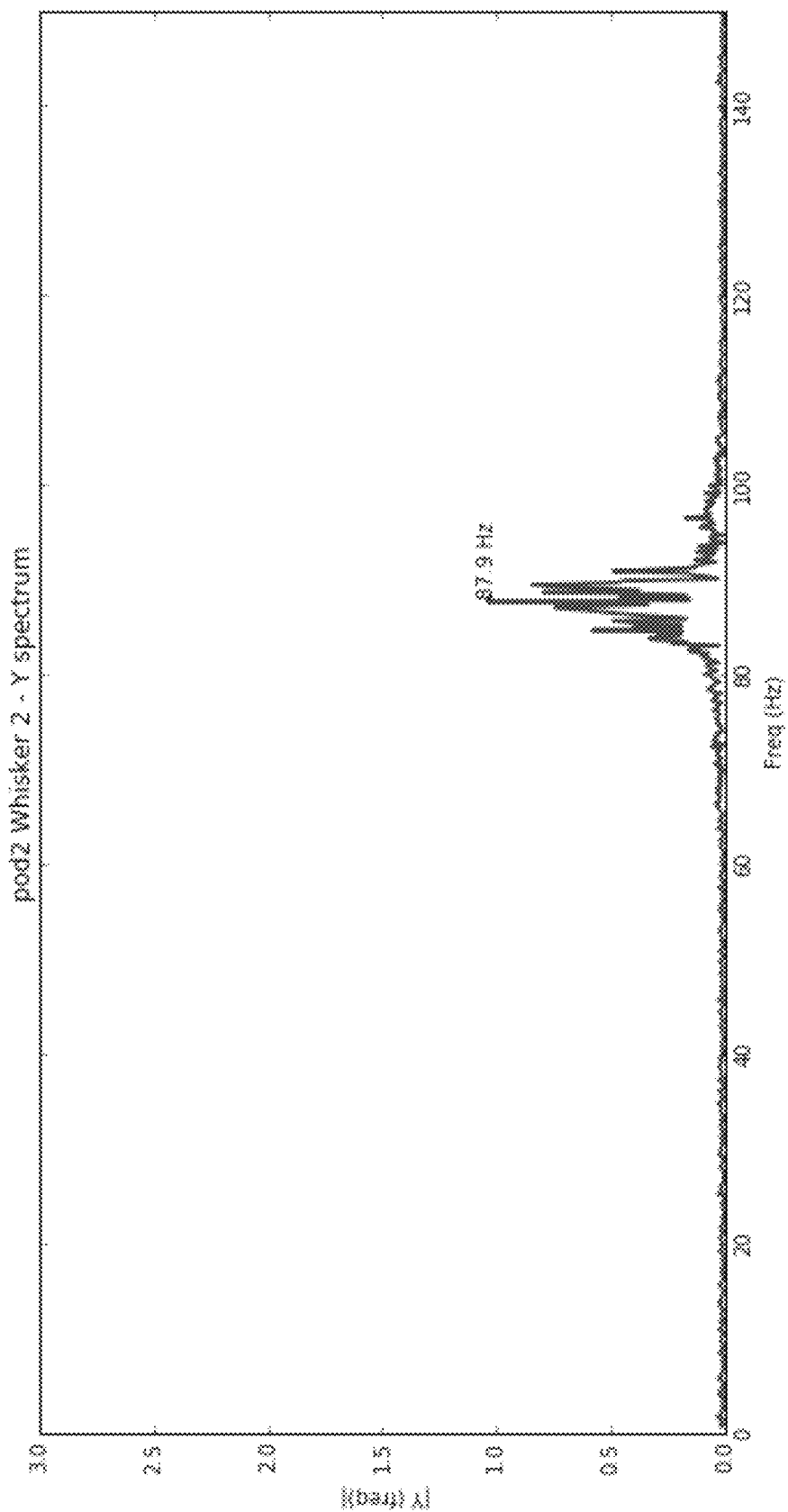
FIG. 6 shows the frequency spectrum at a higher speed, towards the bottom of the sensitivity range, where a distinct peak is detectable.
Figure 7:
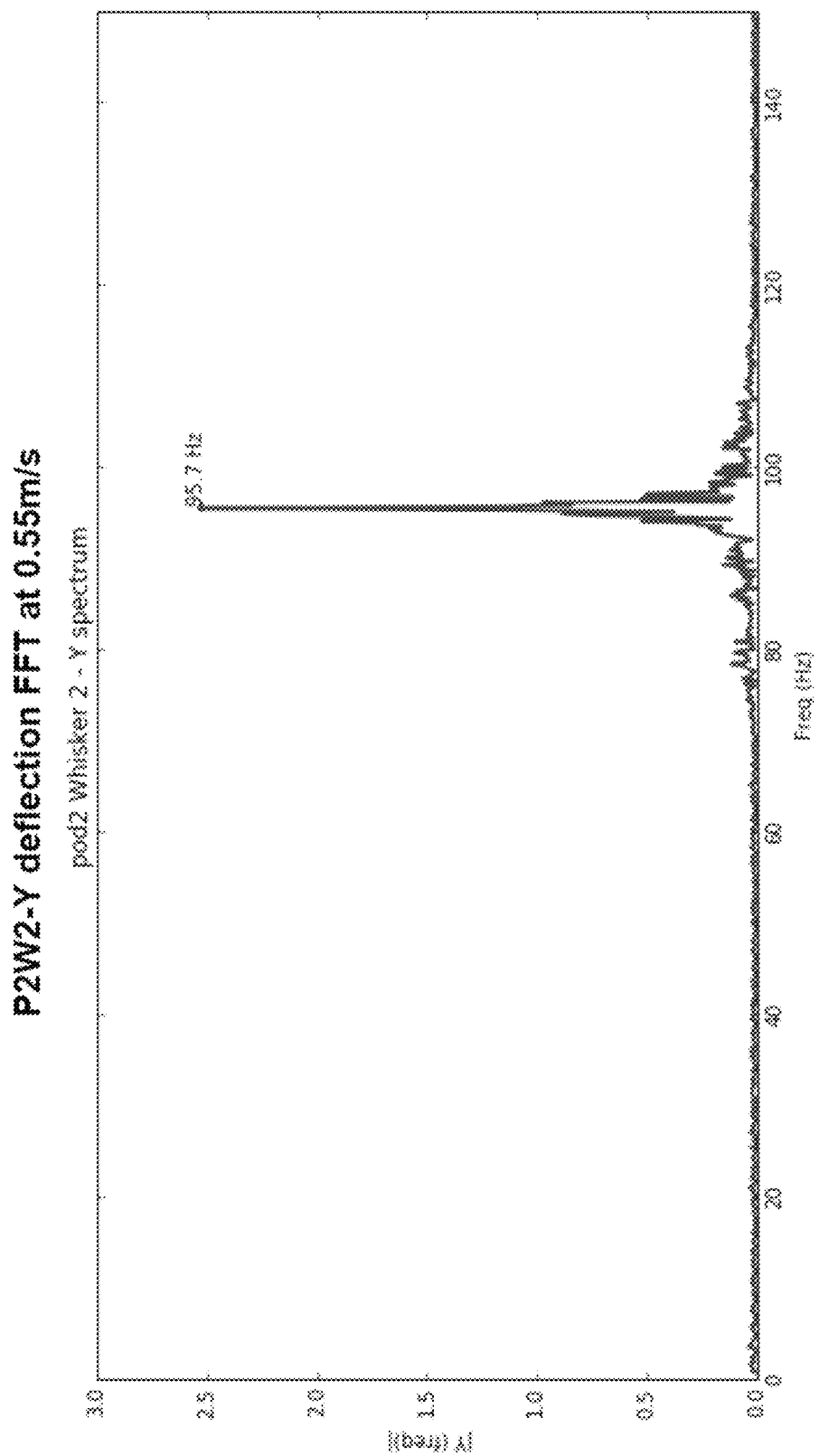
FIG. 7 shows the frequency spectrum higher in the sensitivity range, where a very well-defined peak is visible.

FIGS. 5-7 show spectra at three different speeds, illustrating how the spectrum changes with speed.

FIG. 5 shows the frequency spectrum at a low speed, below the sensitivity range of the whisker under test. No significant peak is visible.

FIG. 6 shows the frequency spectrum at a higher speed, towards the bottom of the sensitivity range, where a distinct peak is detectable.

FIG. 7 shows the frequency spectrum higher in the sensitivity range, where a very well-defined peak is visible.

Figure 8:
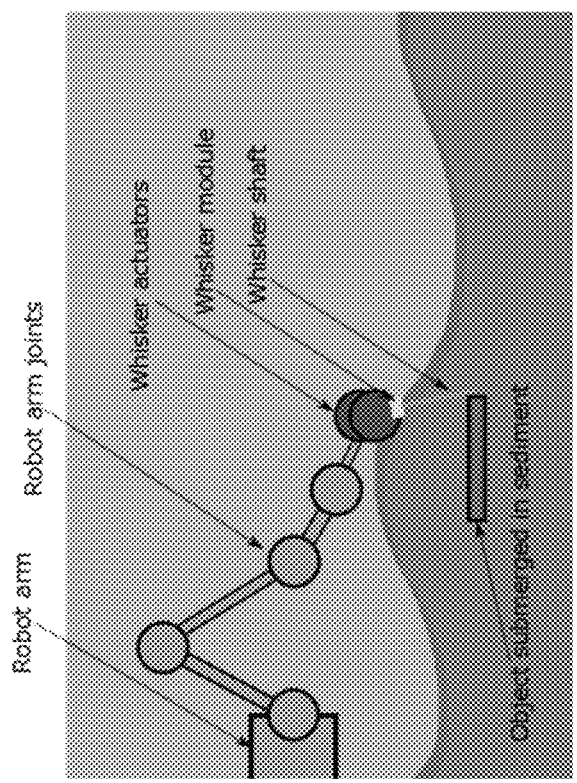
FIG. 8 illustrates one application for a whisker module formed in accordance with the present invention.

FIG. 8 illustrates one application for a whisker module formed in accordance with the present invention. In this embodiment a whisker is provided on a module which in turn is mounted on a robot arm. The whisker shaft can, for example, be rotated to and fro, to cause it to pass through the sediment. When the shaft contacts an object this can be recorded and a picture of the environment can be built up.

This arrangement can be used as part of a tactile sensing system and to measure viscosity and flow speed across the whisker.

If the whisker is swept at a known speed it is possible to calculate viscosity of the medium through which the whisker is being moved. If the whisker is being moved through a medium of known viscosity it is possible to calculate the velocity.

Further examples of aspects and embodiments are listed in the following numbered paragraphs.

1. An artificial whisker sensor comprising an elongate body having a root end and a tip end, in which the body tapers from the root end to the tip end so that the root end is wider and the tip end is narrower, the root end is mounted in a hub, with the hub being in a suspended, pivoting joint, and the pivot point of the body is at substantially the centre point of the hub.

2. A sensor as claimed in paragraph 1, in which the hub is mounted in elastomeric material.

3. A sensor as claimed in paragraph 1 or paragraph 2, in which the tapering is generally constant along the length of the body.

4. A sensor as claimed in any preceding paragraph, in which the body is formed from a composite material.

5. A sensor as claimed in paragraph 4, in which the body is formed from GRP.

6. A sensor as claimed in any preceding paragraph, in which the body has a generally elongated cone shape.

7. A sensor as claimed in any preceding paragraph, in which the body is approximately 1.5 mm at the root end and approximately 0.7 mm at the tip end.

8. A whisker sensor assembly comprising a whisker sensor mounted in a housing, a magnet is attached to the whisker and a magnetic sensor is provided in the housing to detect the position of the magnet and hence the whisker.

9. An assembly as claimed in paragraph 8, in which the whisker is mounted on a hub and the hub is mounted in an elastomeric suspension.

10. An assembly as claimed in paragraph 8 or paragraph 9, in which an accelerometer is provided at or near the base of the whisker.

11. A whisker array comprising a plurality of whiskers and a local processor.

12. An array as claimed in paragraph 11, in which the array consists of three whiskers.

13. A whisker array comprising a cluster of three whiskers and a local processor.

14. An artificial whisker sensor comprising an elongate body having a root end and a tip end, in which the body tapers from root end to the tip end.

15. A sensor comprising a whisker shaft and a follicle, the shaft having a root end and a tip end, in which the shaft tapers from the root end to the tip end so that the root end is wider and the tip end is narrower, the root end is mounted in the follicle so as to provide a uniformly suspended pivot.

16. A sensor comprising a whisker shaft and a follicle, the shaft having a root end and a tip end, in which the shaft tapers from the root end to the tip end so that the root end is wider and the tip end is narrower, and the root end is pivotably mounted in the follicle.

17. A sensor as claimed in paragraph 15 or paragraph 16, in which the root end is attached to a hub, and the hub is mounted in an elastomeric block provided in the follicle.

18. A sensor as claimed in paragraph 17, in which the whisker tends to pivot about a point generally at the centre of the hub.

19. A sensor as claimed in paragraph 17 or paragraph 18, in which the pivot point of the body is at substantially a centre point of the follicle.

20. An artificial whisker sensor for taking angular measurements, comprising a beam-like body having a root end and a tip end, in which the body tapers from the root end to the tip end so that the root end is wider and the tip end is narrower, the root end is mounted in an artificial follicle, and the beam-like body can pivot in the follicle.

21. A sensor as claimed in paragraph 20, in which the whisker root end can move smoothly over a range of angles.

22. A sensor as claimed in paragraph 20 or claim 21, in which a centre of rotation of the whisker is in the follicle.

23. A sensor as claimed in any of paragraphs 20 to 23, in which the follicle includes elastomeric material for providing a restoring force for the whisker.

24. An underwater vehicle provided with one or more whisker sensors and/or whisker assemblies and/or whisker arrays according to any preceding paragraph.

25. A remotely operated vehicle provided with one or more whisker sensors and/or whisker assemblies and/or whisker arrays according to any of paragraphs 1 to 23.

26. A method of tactile exploration comprising: providing one or more artificial whisker sensors, the or each sensor comprising a tapered, elongate body; moving the whisker through material of interest and in doing so causing vortex-induced vibration; and measuring the frequency spectrum of the vibration.

27. A method as claimed in paragraph 26, comprising the step of measuring and/or calculating and/or inferring whisker speed and/or material viscosity.

28. A method as claimed in paragraph 26 or paragraph 27, comprising the step of measuring motion of the sensor/s at the root end thereof.

29. A method as claimed in any of paragraphs 25 to 28, performed using one or more whisker sensors and/or whisker assemblies and/or whisker arrays and/or a vehicle according to any of paragraphs 1 to 25.

Combinations of different aspects and embodiments may be made.

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. An artificial whisker sensor comprising an elongate body having a root end and a tip end, in which the elongate body tapers from the root end to the tip end so that the root end is wider and the tip end is narrower, the root end is mounted in a hub, in which the hub is mounted in an elastomeric block so as to be in a suspended, free pivoting joint with a restoring force for the hub provided by the elastomeric block and being such that the pivot point of the whisker is at substantially the centre of the hub, a magnet is attached to the hub, the magnet is located axially above a magnetic field sensor for detecting the orientation of the magnet, in which deflection of the elongate body rotates the magnet about the pivot point such that it conveys the 2D angular pivot position of the elongate body.

2. The sensor according to claim 1, in which the hub is mounted in a polyurethane-filled follicle case.

3. The sensor according to claim 1, comprising a follicle case and a cast-in-place elastomeric block in the follicle case.

4. The sensor according to claim 3, in which the follicle case comprises an opening for the elongate body and an opening for the magnet.

5. The sensor according to claim 1, in which the magnetic field sensor is a tri-axis Hall effect sensor.

6. The sensor according to claim 1, in which the magnet is bonded to the hub.

7. The sensor according to claim 1, in which the tapering of the elongate body from the root end to the tip end is generally constant along the length of the elongate body.

8. The sensor according to claim 1, in which the hub comprises a flange.

9. The sensor according to claim 8, in which the elongate body is formed from a composite material.

10. The sensor according to claim 9, in which the elongate body is formed from GRP.

11. The sensor according to claim 1, in which the elongate body has a generally elongated cone shape.

12. The sensor according to claim 1, in which the elongate body is approximately 1.5 mm at the root end and approximately 0.7 mm at the tip end.

13. The sensor according to claim 1, in which an accelerometer is provided at or near the root end of the elongate body.

14. A vehicle provided with one or more artificial whisker sensors according to claim 1.

15. A method of exploration using one or more artificial whisker sensors according to claim 1.

16. The method according to claim 15, comprising the step of measuring and/or calculating and/or inferring whisker speed and/or material viscosity.

17. The method according to claim 15 comprising the step of moving the elongate body through material of interest and in doing so causing vortex-induced vibration; and measuring the frequency spectrum of the vibration.

* * * * *